Patented June 12, 1928.

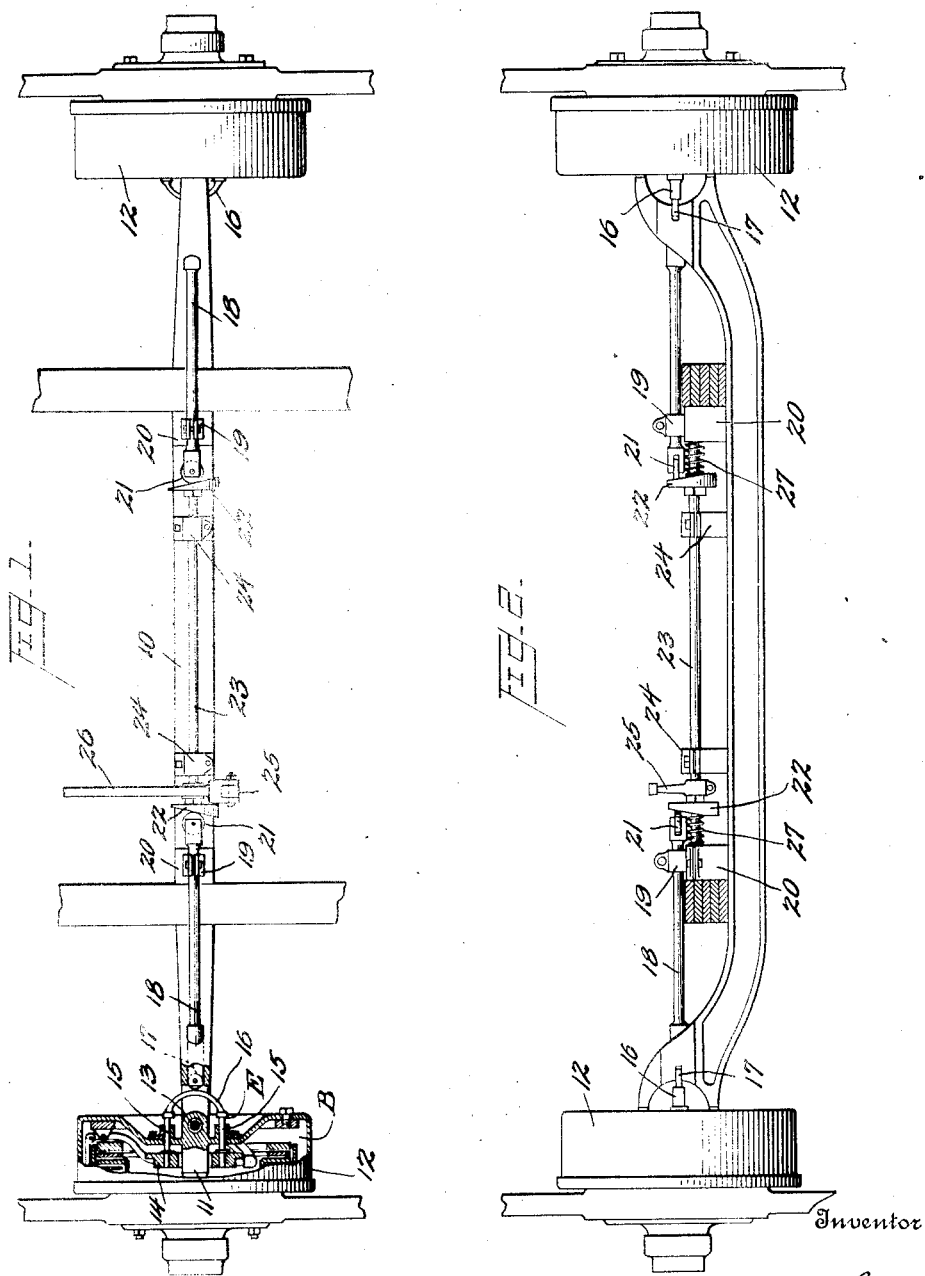

1,673,715

UNITED STATES PATENT OFFICE.

CLARENCE Z. SMITH, OF ATLANTA, GEORGIA.

AUTOMOBILE BRAKE.

Application filed June 25, 1926. Serial No. 118,581.

The present invention relates to vehicle brakes and particularly to braking mechanisms for motor vehicles.

In my copending application Serial Number 740,303 is disclosed and claimed a mechanism for applying braking forces simultaneously to the four wheels of a motor vehicle. The present application has for its subject matter certain of the features disclosed in the application mentioned but not specifically claimed therein, and in particular the brake operating mechanism supported upon the front axle of the motor vehicle and designed to effect the operation of the front wheel brakes under the close control of the operator of the machine.

One form of this mechanism is illustrated in the accompanying drawings, in which:

Figure 1 is a plan view of the front axle of a motor vehicle showing the brake operating mechanism positioned thereon; and Figure 2 is a front elevation of the same.

The axle is indicated at 10, one of the steering knuckles at 11, and the braking mechanism generally at B. Braking mechanism is enclosed within a casing 12 supported on the steering knuckle 11 and turns with the wheel, it being understood that the steering knuckle has the usual rotary movement relatively to the axle about the steering knuckle pin 13. The details of the braking mechanism are fully disclosed in my copending applications Serial Numbers 687,602 and 740,303, and it is sufficient for present purposes merely to state that braking forces are applied by outward movement of a ring 14 which encircles the steering knuckle 11 and these forces are released by inward or return movement of this ring. A ring operating element is indicated generally at E, this element having straight portions 15 the outer ends of which are connected by a semicircular member 16 the outer face of which, i. e. the face directed toward the center of the motor vehicle, has all points disposed substantially equidistant from the axis of the steering knuckle pin 13.

A roller 17 is normally in contact with the curved face of member 16, this roller being supported upon the outer end of a rod 18 which is mounted on the axle so as to have a limited movement longitudinally thereof. Thus the outer end of rod 18 extends through an opening formed in the upwardly curved portion of the axle, this end portion being yoke shaped or bifurcated in the usual manner to provide bearings for the upper and lower ends of the steering knuckle pin 13. The inner end of the rod 18 extends through a bearing 19 supported upon a block 20 secured to the axle and is also provided with a roller 21. Roller 21 is in constant engagement with the inclined face of a circular cam 22 fixed upon a rotatable shaft 23 supported in bearing blocks 24, also fixed on the axle. An operating arm 25 fixed on shaft 23 may be connected by a link 26 to manually operable means such as a foot pedal or hand lever (not illustrated) within convenient reach of the driver of the vehicle. Shaft 23 is not only rotatable but is mounted in bearings 24 for sliding movement longitudinally to a limited extent.

While the brake operating mechanism for one wheel only is described, it will be understood that exactly similar mechanism is provided for the opposite wheel, both mechanisms being simultaneously actuated by rotation of shaft 23 through cams 22, rods 18, rollers 17 and elements E. Springs 27 positioned on the encircling ends of the shaft have their inner ends in abutment with cams 22 and their outer ends in contact with blocks 20. These springs oppose each other and tend to maintain shaft 23 in a central position but at the same time permit longitudinal movement of the shaft when it is rotated upon application of the brakes in the event that one brake mechanism has been subjected to greater wear than the companion mechanism. This floating shaft is an automatic adjusting means, therefore, which makes certain the application of exactly equal braking forces to the two wheels notwithstanding any differences, such as unequal wear, which may occur in the mechanisms.

Without departing from the spirit and scope of the invention, minor changes may be made in the design and arrangement of the component elements and the invention is not limited to that embodiment which is described and illustrated.

Having thus described the invention, what is claimed as new and desired to be secured by Letters Patent is:

1. Braking mechanism for the front wheels of a vehicle including in combination, an axle having steering knuckles connected to the ends thereof, a wheel and brake mechanism therefor supported on each steering knuckle, and brake operating mechanism supported on the axle comprising members movably supported on the axle and in constant operative engagement with the brake mechanisms respectively, and intermediate cam mechanism for simultaneously operating said members.

2. The combination set forth in claim 1 in which said last mentioned mechanism comprises two spaced cams, one engaging each of said members, and common operating means for said cams.

3. The combination set forth in claim 1 in which said intermediate cam mechanism comprises two spaced cams, one engaging each of said members, a rotatable rod upon which both cams are fixed, and an arm also fixed upon said rod and by means of which it may be rotated.

4. The combination set forth in claim 1 in which said intermediate mechanism comprises two spaced cams, one engaging each of said members, and a rod upon which said cams are fixed, said rod being rotatably and slidably mounted on the axle.

5. Braking mechanism for the front wheels of a vehicle including in combination, an axle having a steering knuckle pivotally connected to the end thereof, a wheel and brake mechanism supported on the steering knuckle, and brake operating mechanism comprising a rod slidable longitudinally of the axle having its outer end extending through an aperture formed in the raised end of the axle and its inner end extending through a bearing secured to the axle, the outer end of said rod being in constant operative engagement with said brake mechanism, and means for operating said rod to cause actuation of the brakes.

6. Braking mechanism for the front wheels of a vehicle including in combination, an axle having a steering knuckle pivoted to each end thereof, a wheel and brake mechanism therefor supported on each steering knuckle, and brake operating mechanism supported on the axle comprising a pair of aligned rods extending longitudinally of the axle and slidably supported thereon, said rods having their outer ends in constant operative engagement with the brake mechanism for all angular positions of the steering knuckles, and means for simultaneously operating said rods.

7. Braking mechanism for the front wheels of a vehicle including in combination, an axle having a steering knuckle pivotally connected to the end thereof, a wheel and brake mechanism supported on the steering knuckle, and brake operating mechanism mounted on the axle comprising a rod slidable longitudinally of the axle, having its outer end extending through an aperture formed in the raised end of the axle, and its inner end extending through a bearing secured to the axle and cam mechanism for operating said rod to cause actuation of the brakes.

In testimony whereof I hereunto affix my signature.

CLARENCE Z. SMITH.